United States Patent Office 2,952,752
Patented Sept. 13, 1960

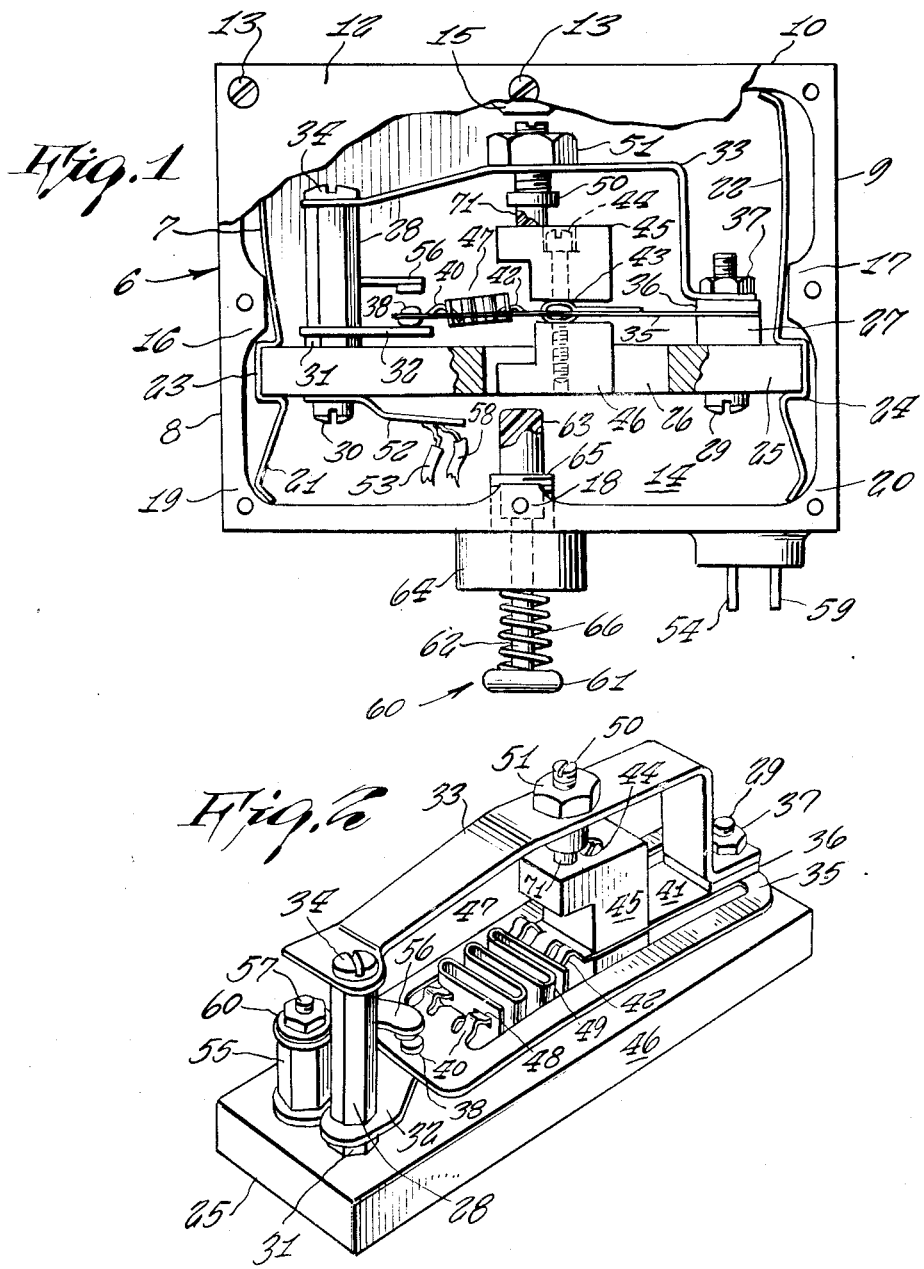

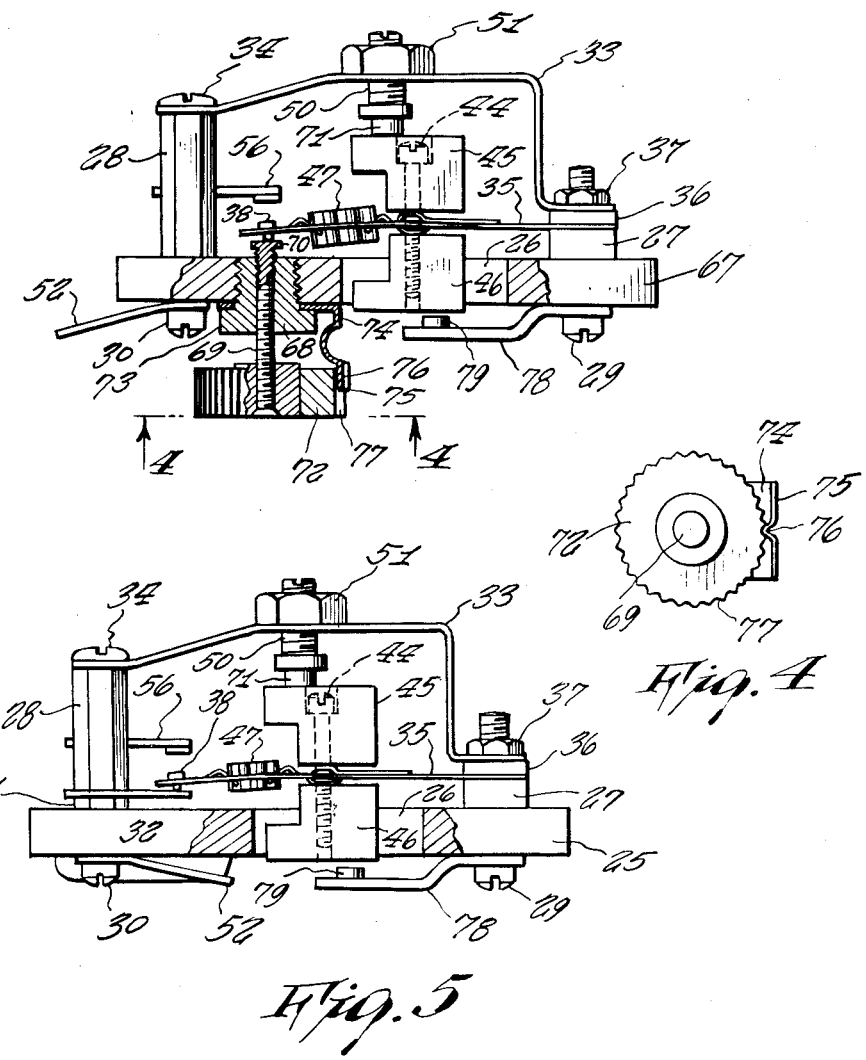

2,952,752

BASIC SENSING ELEMENT, ADJUSTABLE MANUAL RESET ACCELERATION SWITCH

Preston R. Weaver, Nyack, N.Y., assignor to The W. L. Maxson Corporation, New York, N.Y., a corporation of New York Filed Nov. 7, 1956, Ser. No. 620,909

19 Claims. (Cl. 200—61.45)

This invention relates to electrical switches used for special purposes such as vibration and acceleration testing, and particularly to a sensing element adjustable as to acceleration setting and resettable by manual or electro-mechanical means.

The main object of my invention is to produce a sensing element which is operable to open or close a given circuit; or to open one and close another circuit simultaneously, upon the switch being subjected to a predetermined acceleration or amplitude of vibration, without manually operating the switch.

Another object of my invention is to provide a sensing element acceleration switch which is manually adjustable for response to selected ranges of vibration and acceleration.

A further object of this invention is to have such an automatically operated adjustable acceleration switch which is capable of being manually or electromechanically resettable for repeat operation after having operated in response to a predetermined vibration or acceleration.

Yet another object of the invention is to have an acceleration switch of the character indicated which combines a group of interrelated functions and advantages to render possible critical tests of the overall performance of aircraft and vehicles.

A practical object of the invention is to have such an acceleration switch that is ready, compact and reasonably light so that the craft upon which it is mounted will not be seriously burdened or have its performance altered thereby.

It is, of course an important object of the invention to have such a special acceleration switch which is not only adjustable and manually or automatically resettable for further operation, but accurate and reliable in its adjustments and response and also certain to operate as expected.

Other objects and advantages of my invention will appear more fully in detail as the specification proceeds.

In order to facilitate ready comprehension of this invention for a proper appreciation of the salient features thereof, the invention is illustrated on the accompanying drawing forming part hereof, and in which:

Fig. 1 is a side elevation of a manual reset acceleration switch made according to the invention and embodying the same in a practical form, the near side or cover being largely torn away to disclose the construction and general arrangement of the parts of the switch;

Fig. 2 is a perspective view of a basic pre-calibrated, automatic reset acceleration switch;

Fig. 3 is a side elevation of a modification of the basic switch to illustrate adjustable acceleration settings with automatic reset;

Fig. 4 is a bottom plan view of part of Fig. 3 as seen from below on line 4—4; and of the adjustment gear showing detail;

Fig. 5 is also a side elevation of the basic acceleration switch.

In these views, the same reference numerals indicate the same parts throughout.

Upon aircraft, it is important that undue vibration and acceleration be detected and checked before reaching dangerous levels, and upon test planes, during designing and manufacture of various models, performance with respect to vibration and acceleration in travel must be accurately ascertained. Thus it is possible to redesign portions of the fuselage or other parts of the craft being tested, until substantially all such disadvantages are virtually overcome and the plane or other aircraft involved is no longer subject to undue response to any vibration or acceleration within predetermined limits. In order to detect such vibration or acceleration, an electrical detecting system is installed upon the craft, and I propose to control such a system by a special acceleration switch which responds by operating to selected vibration ranges. It is, of course, important that such a switch be readily adjusted and preferably capable of being reset for further operation.

In order to embody the features and advantages outlined above, I have produced a special acceleration switch which will now be described in detail.

In the practice of my invention, and referring also to the drawings, a switch casing generally indicated at 6 has a switch chamber 7 bounded by end walls 8 and 9, top wall 10 and bottom wall 11, while a front cover 12 is removably secured to the casing by screws 13. A rear wall 14, substantially parallel to front cover 12, may either be an integral part of the casing with the walls or a rear cover secured in place by screws or rivets. This casing may be a die casting, plastic molded article or the like, but so designed internally that a group of internal end bosses and top and bottom bosses 15, 16, 17 and 18, as well as corner reinforcements 19, 20 etc. receive the screws 13. Bosses 16 and 17 locate a pair of supporting brackets 21 and 22.

The supporting brackets fit at their ends between the top and bottom walls 10 and 11 and have intermediate seating portions formed at 23 and 24 to receive the ends of switch base 25. The switch base is preferably made of rigid insulating material having an intermediate opening 26 therethrough. Near the ends of this base are mounted a pair of end posts 27 and 28 held in place by screws 29 and 30. Upon the lower portion of post 28 is mounted a stationary contact 32, in the case of non-adjustable acceleration switch, while upon the upper end of the post is fixed one end of a bracket 33 by screw 34. The contact 32 is spaced from the base 25 by a washer 31.

The post 27 supports a long flat contact spring 35. Above this spring is a washer 36 upon which the other end of bracket 33 is secured by a nut 37. The contact spring 35 is directed toward post 28 and terminates in a contact button 38. This spring, intermediate its length, has an open area 39. Mounting lugs 40 extend from one end of the spring into this open area and a tongue 41, terminating in similar mounting lugs 42, extends into this area from the other end of the spring. At an intermediate point along tongue 41 is a pair of spring washers 43 through which a long screw 44 extends and secures a pair of inertia blocks 45 and 46, one block above and one block below this upstanding portion, for a purpose to be explained.

Between the lugs 40 and 42 is mounted a serpentine compression spring 47 with end apertures 48 and 49 into which the lugs 40 and 42 extend. The spring 47 exerts pressure against these lugs, and incidentally against the inner end of tongue 41, in such manner as to tend to snap the tongue upwardly, past the central plane of the spring 35, imparting an upward movement to inertia blocks 45 and 46. By this upward movement of the tongue and inertia blocks, the portion of the contact spring 35, to which is affixed contact button 38, will be arched downwards to make contact with lug 32 as shown.

The upper block of the inertia system is limited in its upward movement by an adjustable screw 50 extending down through the intermediate portion of bracket 33 and the screw is fixed in place by locking nut 51. This adjustment is initially made so that button 38 on spring 35 will make active engagement with contact 32 which is the set position of the switch prior to operation.

The end post 27 and its screw 29 are metal. This is true also of screw 30 but washer 31 and the tall post 28 are preferably made of some insulating plastic such as nylon or any other desired non-conductive material. Beneath base 25, a metal lug 52 is secured by screw 38 having a lead 53 connected to one of connector lugs 54. Beyond screw 30 and its lug 52 is disposed another lug (not shown) and screw (not shown) securing short post 55 (Fig. 2) having a top contact 56 secured thereon by a screw 57. The concealed lug, beneath base 25 connected to post 55, has a lead 58 connected to the lug 59. Portions of the leads being omitted for clarity in the drawing, as they are well understood. The short post 55 is metal and is retained assembled upon its screw by nut 60 which holds down contact 56 located above spring contact 38.

The arrangement is such that when this switch is connected by lugs 54 and 59 to two alternate circuits and is itself mounted upon an aircraft to be tested for acceleration, any undue acceleration will cause the inertia system 45 and 46 to buckle tongue 41 downwards. This will snap the free end of spring 35 upward so that the contact button 38 engages the upper contact 56 of short post 55. The blocks 45 and 46 are then in a lowered position causing the spring contact 56 until the acceleration reduces to a value less than that for which the switch was calibrated; at that time, the free end of spring 35 will snap back to its original position, for the automatic reset type while for the manual reset type some outside force restores contact button 38 on the free end of spring 35 to engage contact 32 as a first.

To reposition the inertia blocks for a manual reset type switch, a reset plunger 60 extends with its stem 62 through the bottom wall 11 of casing 6. The stem has an upper insulated cylindrical end 63 slidably extending through a stationary hub 64 secured upon said bottom wall 11. The hub is secured to the bottom wall by its reduced end 65 being screwed through this wall. A compression spring 65 is located between hub 64 and plunger handle or knob 61 for withdrawing the upper end 63 from contact with lower block 46 when the plunger is pushed upwards to reset the switch. As plunger 63 is pushed upwards it raises the inertia system 45 and 46 to restore spring contact 38 to engage lower contact 32 ready to operate again.

The inertia system could be repositioned by either an electromagnet or a solenoid (not shown) of conventional design. This electromagnet can be connected if desired, with one of the contact buttons of the sensing switch to automatically reset the inertia blocks after the switch has been activated. The electromagnet could also be included in a separate circuit so as to reset the inertia system upon the activation of outside independent means. In either embodiment when the electromagnet is energized it would engage plunger knob 61 and push the plunger upwards, as hereinbefore described, to reset the switch.

The switch mounted on base 25 is readily removable from casing 6 by first removing cover 12 and then withdrawing the switch structure and brackets 21 and 22 holding base 25. These brackets simply drop off the base and the switch is then free and accessible for cleaning, repairs or adjustment.

In Figs. 3 and 4 is shown a modification wherein the base 67 is similar to switch base 25, however, base 67 has a threaded nipple 68 secured directly beneath the contact button 38 of contact spring 35, through which nipple a long contact screw 69 rotatably extends. The upper end 70 of this screw 69 forms adjustable contact for the lower position of spring contact 38 instead of the stationary contact 32 as before described. This screw is provided upon its lower end with a toothed adjusting knob 72 adapted to be turned manually to raise or lower contact 70. Under the head 73 (Fig. 3) of nipple 68 is secured one end of a stop spring 74. This spring end has a lug 75 which is provided with an inward projecting tooth 76 (Fig. 4) frictionally engaging the peripheral teeth 77 of knob 72 to retain this knob in stationary position. The upper bracket 33, inertia system 45 and 46, serpentine spring 47 and the upper adjustable stop screw 50 with its insulated lower end 71 are all as described for Figs. 1 and 2. This switch may be manually reset as described or automatically reset as described.

The contact 70 may be minutely adjusted by knob 72 so that the contact spring is delicately balanced, with its inertia system 45 and 46, between lower end 71 of adjusting screw 50 and lower stop 79, causing the acceleration at which the switch is to close to be set to a desired value. When the correct adjustment has been attained, the stop spring 74 with its tooth 76 will prevent accidental rotation of knob 72. In this form of the switch, the insulating post 28 has no washer 31 nor any stationary contact 32 in view of the adjustable screw contact 70 just described.

In Fig. 5 is shown a switch in which all features correspond to those found in Figs. 1 and 2, except the resetting plunger 60 has been replaced by lug 78 and stop button 79 secured by screw 29 to the base below lower block 46 of the inertia system. In this form of the switch, the location of the inertia blocks 45 and 46 between the lower end 71 of upper adjusting screw 50 and the stop 79 is so carefully adjusted that the switch is self-resetting as in the switch of Figs. 3 and 4 just described.

In each case, the switch is not manually operated to connect the critical circuit. Instead, the expected acceleration of the aircraft upon which the switch is installed will effect this operation by reaction of the inertia of blocks 45 and 46, as they load the contact spring with their inertia and thus effect operation thereof in desired manner. The resetting of the contact spring is accomplished either manually or by adjustment or accurate initial location of the active switch parts.

In any form of the switch described, it may be made compact and may easily be slipped into the casing 7. Within this casing, the switch has ample space to operate, as above set forth, to detect any undue vibration or acceleration of aircraft carrying the switch, the circuits involved in the operation being connected through connector lugs 54 and 59 to the switch parts and contacts within the casing.

I have described what I believe to be the best embodiments of my invention. I do not wish, however, to be confined to the embodiments shown, but what I desire to cover by Letters Patent is set forth in the appended claims.

I claim:

1. A sensing element reset acceleration switch including a base member, a spring contact mechanism having a fixed end and a free end, a pair of substantially parallel flexible resilient arms connecting said fixed end and said free end, an open area intermediate said arms, a compression spring disposed in said open area fixedly attached to one end of said spring contact mechanism, a tongue longitudinally extending into the open area from the other end of said contact spring mechanism and fixedly mounted at its extremity to the compression spring, mounting means securing the fixed end of the contact spring mechanism to the base member, a pair of contacts mounted on the base member, a contact button on the free end of the spring contact mechanism disposed between the contacts, means for connecting the contacts into different circuits, an inertia system including an inertia block mounted on said tongue, and adjustable means for limiting movement of said inertia system to a predetermined amplitude, said adjustable means being in alignment with the path of movement of said inertia block.

2. A sensing element reset acceleration switch according to claim 1, wherein said limiting means includes a bracket extending over said contact spring mechanism, and an adjustable stop member mounted on said bracket and adapted to be engaged by said inertia system.

3. A sensing element reset acceleration switch including a base member, a spring contact mechanism having a fixed end and a free end, a pair of substantially parallel flexible resilient arms connecting said fixed end and said free end, an open area intermediate said arms, a compression spring disposed in said open area fixedly attached to one end of said spring contact mechanism, a tongue longitudinally extending into the open area from the other end of said contact spring mechanism and fixedly mounted at its extremity to the compression spring, mounting means securing the fixed end of the contact spring mechanism to the base member, a pair of contacts mounted on the base member, a contact button on the free end of the spring contact mechanism disposed between the contacts, means for connecting the contacts into different circuits, an inertia system, including an inertia block, mounted on said tongue, means for limiting movement of said inertia system to a predetermined amplitude and means whereby one of said contacts is vertically adjustable.

4. A sensing element reset acceleration switch according to claim 3, wherein said vertical adjustable contact means includes a threaded nipple extending through the base member, a screw rotatably extending through said nipple, a contact on the upper extremity of said screw, a toothed knob affixed to the lower extremity of said screw and a stop spring at one end fixedly mounted on the base member and the other end of said stop spring adapted to engage the toothed portion of said knob to retain the knob in a stationary position.

5. A sensing element reset acceleration switch including a base member, a spring contact mechanism having a fixed end and a free end, a pair of substantially parallel flexible resilient arms connecting said fixed end and said free end, an open area intermediate said arms, a compression spring disposed in said open area fixedly attached to one end of said spring contact mechanism, a tongue longitudinally extending into the open area from the other end of said contact spring mechanism and fixedly mounted at its extremity to the compression spring, mounting means securing the fixed end of the contact spring mechanism to the base member, a pair of contacts mounted on the base member, a contact button on the free end of the spring contact mechanism disposed between the contacts, means for connecting the contacts into different circuits, an inertia system including two inertia blocks, one block fixedly mounted above said contact spring mechanism and one block fixedly mounted below said contact spring mechanism, an open area in said base member to allow the inertia system to fall and means for limiting movement of said inertia system to a predetermined amplitude including a lug attached to the lower portion of the base member and a stop button on the extremity of said lug adapted to be engaged by said inertia system.

6. A sensing element reset acceleration switch according to claim 5, wherein said limiting means also includes a bracket extending over said contact spring mechanism and an adjustable stop member mounted on said bracket and adapted to be engaged by said inertia system.

7. A sensing element reset acceleration switch according to claim 6, wherein one of said contacts includes a threaded nipple extending through the base member, a screw rotatably extending through said nipple, a contact on the upper extremity of said screw, a toothed knob affixed to the lower extremity of said screw and a stop spring at one end fixedly attached to the base member and the other end of said stop spring adapted to engage the toothed portion of the knob to retain the knob in a stationary position.

8. A sensing element reset acceleration switch according to claim 7, having a switch casing including a pair of end walls, a bottom wall, a top wall and a rear wall, a pair of releasable end brackets, a seating portion intermediate said end brackets engaging opposite ends of the base member, said base member being elongated and means for securing said bracket within said casing.

9. A sensing element reset acceleration switch including a base member, a spring contact mechanism having a fixed end and a free end, a pair of substantially parallel flexible resilient arms connecting said fixed end and said free end, an open area intermediate said arms, a compression spring disposed in said open area fixedly attached to one end of said spring contact mechanism, a tongue longitudinally extending into the open area from the other end of said contact spring mechanism and fixedly mounted at its extremity to the compression spring, mounting means securing the fixed end of the contact spring mechanism to the base member, a pair of stationary contacts mounted on the base member, a contact button on the free end of the spring contact mechanism disposed between the stationary contacts, means for connecting the stationary contacts into different circuits, an inertia system including two inertia blocks, one block fixedly mounted above said contact spring mechanism and one block fixedly mounted below said contact spring mechanism, an open area in said base member to allow the inertia system to fall and means for limiting movement of said inertia system to a predetermined amplitude including a plunger mechanism fixedly mounted below said contact spring mechanism and means to return the plunger mechanism to its original idle position after the plunger has been manually operated to reset the inertia blocks and contact spring mechanism.

10. A sensing element reset acceleration switch according to claim 9, wherein said limiting means also includes a bracket extending over said contact spring mechanism and an adjustable stop member mounted on said bracket and adapted to be engaged by said inertia system.

11. A sensing element reset acceleration switch according to claim 10, wherein said plunger mechanism includes a stationary hub secured to the bottom wall of said base member, a stem slidably extending through said hub of said bottom wall, a knob on the lower extremity of said stem, a cylindrical end at the upper extremity of said stem adapted to engage the inertia system and wherein said plunger mechanism return means includes a compression spring between the knob and the hub.

12. A sensing element reset acceleration switch including a base member, a spring contact mechanism having a fixed end and a free end, a pair of substantially parallel flexible resilient arms connecting said fixed end and said free end, an open area intermediate said arms, a compression spring disposed in said open area fixedly attached to one end of said spring contact mechanism, a tongue longitudinally extending into the open area from the other end of said contact spring mechanism and fixedly mounted at its extremity to the compression spring, mounting means securing the fixed end of the contact spring mechanism through the base member, a pair of stationary contacts mounted on the base member, a contact button on the free end of the spring contact mechanism disposed between the stationary contacts, means for connecting the stationary contacts into different circuits, an inertia system including two inertia blocks, one block fixedly mounted above said contact spring mechanism and one block fixedly mounted below said contact spring mechanism, an open area in said base member to allow the inertia system to fall, means for limiting movement of said inertia system to a predetermined amplitude including a plunger mechanism fixedly mounted below said contact spring mechanism, means to return the plunger mechanism to its original idle position after the plunger has been manually operated to reset the inertia blocks and contact spring mechanism, said limiting means also including a bracket extending over said contact spring mechanism and an adjustable stop member mounted on said bracket and adapted to be engaged by said inertia system, said plunger mechanism including a stationary hub secured to the bottom wall of said base member, a stem slidably extending through said hub of said bottom wall, a knob on the lower extremity of said stem and a cylindrical end at the upper extremity of said stem adapted to engage the inertia system, said plunger mechanism return means including a compression spring between the knob and the hub, a switch casing including a pair of end walls, a bottom wall, a top wall and a rear wall, a pair of releasable end brackets and a seating portion intermediate said end bracket engaging opposite ends of the base member, said base member being elongated and means for securing said bracket within said casing.

13. A sensing element reset acceleration switch including a base member, a spring contact mechanism having a fixed end and a free end, a pair of substantially parallel flexible resilient arms connecting said fixed end and said free end, an open area intermediate said arms, a compression spring disposed in said open area fixedly attached to one end of said spring contact mechanism, a tongue longitudinally extending into the open area from the other end of said contact spring mechanism and fixedly mounted at its extremity to the compression spring, mounting means securing a fixed end of the contact spring mechanism to the base member, a pair of stop members mounted on the base member, the free end of the contact spring mechanism being disposed between the stop members, and an inertia system including an inertia block located adjacent said tongue and displaceable in response to acceleration to deflect said tongue into engagement with the other of said stop members, and adjustable means for limiting movement of said inertia block, said adjustable means being in alignment with the path of movement of said inertia block.

14. A sensing element reset acceleration switch according to claim 13 wherein said inertia system includes an inertia block positioned above said tongue.

15. An acceleration actuable switch comprising a base member, a resilient contact arm having one end fixed on said base member and the opposite end provided with contact button means, a contact member disposed adjacent at least one side of said contact button means, said contact arm being biased into contact with said contact button means, an inertia mass located adjacent said contact member and movable in response to acceleration of said switch against the biasing of said contact arm to move said arm out of contact with said contact button means, and adjustable means for limiting movement of said inertia block, said adjustable means being in alignment with the path of movement of said inertia block.

16. An acceleration actuable switch according to claim 15 wherein said inertia mass is secured to said arm.

17. An acceleration actuable switch according to claim 16 including means for limiting movement of said inertia mass.

18. An acceleration actuable switch comprising a base member, a resilient contact arm having one end fixed on said base member and the opposite end provided with contact button means, a contact member disposed adjacent said contact button means, said contact arm being biased into contact with said contact member, an inertia mass connected to said contact arm and movable in response to acceleration of said switch along with said arm to move said arm into contact with the said contact member, and adjustable means to limit movement of said inertia mass, said adjustable means being in alignment with the path of movement of said inertia block.

19. An acceleration switch according to claim 18 wherein said means for limiting movement of said mass includes adjustable stop means located on each side of said spring contact arm.

References Cited in the file of this patent
UNITED STATES PATENTS

| | | |
|---|---|---|
| 2,260,964 | Wilms | Oct. 28, 1941 |
| 2,378,784 | Obszarny | June 19, 1945 |
| 2,521,015 | McLaren et al. | Sept. 5, 1950 |
| 2,691,516 | Fischer | Oct. 12, 1954 |
| 2,788,415 | Payne | Apr. 9, 1957 |
| 2,807,690 | Schwaneke | Sept. 24, 1957 |
| 2,867,382 | Weaver | Jan. 6, 1959 |
| 2,897,306 | Weaver | July 28, 1959 |